(12) United States Patent
Zhang et al.

(10) Patent No.: US 12,086,171 B2
(45) Date of Patent: Sep. 10, 2024

(54) WORD MINING METHOD AND APPARATUS, ELECTRONIC DEVICE AND READABLE STORAGE MEDIUM

(71) Applicant: BEIJING BAIDU NETCOM SCIENCE TECHNOLOGY CO., LTD., Beijing (CN)

(72) Inventors: Yang Zhang, Beijing (CN); Shuangquan Yang, Beijing (CN); Lei Han, Beijing (CN); Keke Zhou, Beijing (CN); Yi Xie, Beijing (CN); Wei Zhou, Beijing (CN); Junyi Chen, Beijing (CN); Dongjian Shi, Beijing (CN); Guihua Bai, Beijing (CN); Xuan Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 25 days.

(21) Appl. No.: 17/812,120

(22) Filed: Jul. 12, 2022

(65) Prior Publication Data

US 2023/0052623 A1 Feb. 16, 2023

(30) Foreign Application Priority Data

Aug. 12, 2021 (CN) .......................... 202110925212.0

(51) Int. Cl.
*G06F 7/00* (2006.01)
*G06F 16/33* (2019.01)
*G06F 40/289* (2020.01)

(52) U.S. Cl.
CPC ...... *G06F 16/3344* (2019.01); *G06F 16/3347* (2019.01); *G06F 40/289* (2020.01)

(58) Field of Classification Search
CPC .. G06F 16/3344; G06F 16/337; G06F 16/332; G06F 16/3347; G06F 16/9535;
(Continued)

(56) References Cited

U.S. PATENT DOCUMENTS 10,049,420 B1 8/2018 Lee et al.
2005/0273460 A1* 12/2005 Abrams ................. G06F 16/88
(Continued)

FOREIGN PATENT DOCUMENTS

CN 101751422 A 6/2010
CN 105262913 A 1/2016
(Continued)

OTHER PUBLICATIONS

Extended European Search Report for EP22184155.4, issued on Nov. 4, 2022, 9 pgs.
(Continued)

*Primary Examiner* — Mohammad A Sana
(74) *Attorney, Agent, or Firm* — Kwan & Olynick LLP

(57) ABSTRACT

A word mining method and apparatus, an electronic device and a readable storage medium are disclosed. The method includes: acquiring search data; taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph; obtaining a label vector of each search sentence in the behavior graph according to a search sentence with a preset label in the behavior graph; determining a target search sentence in the behavior graph according to the label vector; and extracting a target word from the target
(Continued)

search sentence, and taking the target word as a word mining result of the search data.

17 Claims, 5 Drawing Sheets

(58) Field of Classification Search
CPC .... G06F 16/9024; G06F 16/367; G06F 40/30; G06F 40/289; G06F 40/216; G06F 40/279; G06F 40/295
See application file for complete search history.

(56) References Cited

U.S. PATENT DOCUMENTS

| | | | |
|---|---|---|---|
| 2007/0250500 | A1 | 10/2007 | Ismalon |
| 2012/0259850 | A1 | 10/2012 | Liu et al. |
| 2013/0024439 | A1 | 1/2013 | Reinholdtsen et al. |
| 2013/0173917 | A1* | 7/2013 | Clifton .................. G06F 16/334 713/167 |
| 2014/0250377 | A1 | 9/2014 | Bisca et al. |
| 2015/0339405 | A1 | 11/2015 | Vora et al. |
| 2021/0192134 | A1* | 6/2021 | Yue ..................... G06F 16/3326 |
| 2021/0209312 | A1 | 7/2021 | He et al. |
| 2021/0303802 | A1* | 9/2021 | Morita ................. G06N 3/045 |
| 2022/0179909 | A1* | 6/2022 | Bender ............. G06F 16/24578 |

FOREIGN PATENT DOCUMENTS

| | | |
|---|---|---|
| CN | 106445989 A | 2/2017 |
| CN | 108763556 A | 11/2018 |
| CN | 111159348 A | 5/2020 |
| CN | 111274407 A | 6/2020 |
| CN | 111488386 A | 8/2020 |
| CN | 112148890 A | 12/2020 |
| JP | 2009064191 A1 | 3/2009 |
| JP | 2010118021 A | 5/2010 |
| JP | 2010176285 A | 8/2010 |
| JP | 2015022528 A | 2/2015 |
| JP | 2018067193 A | 4/2018 |

OTHER PUBLICATIONS

Chinese First Office Action for App. No. CN2021109252120, 7 pages.
Chinese Notice of Allowance for App No. CN2021109252120, 4 pages.
First Office Action for JP2022-125610, issued on Oct. 31, 2023, 2 pgs.
Hidmaeda, Sufujita, Retrieval Intention Understanding Method to Find Sub Topic of Query by Using Attribute Propagation and Linguistic Nature on Click Bipartite Graph, Dec. 15, 2010, 9 pgs.
Kei Uchiumi, et al., Abbreviation Expansion With Query and Click Through Logs, Aug. 18, 2015, 8 pgs.

* cited by examiner

WORD MINING METHOD AND APPARATUS, ELECTRONIC DEVICE AND READABLE STORAGE MEDIUM

The present application claims the priority of Chinese Patent Application No. 202110925212.0, filed on Aug. 12, 2021, with the title of "WORD MINING METHOD AND APPARATUS, ELECTRONIC DEVICE AND READABLE STORAGE MEDIUM". The disclosure of the above application is incorporated herein by reference in its entirety.

FIELD OF THE DISCLOSURE

The present disclosure relates to the field of data processing technologies, and particularly to the field of artificial intelligence technologies, such as natural language processing technologies, deep learning technologies, cloud service technologies, or the like, and provides a word mining method and apparatus, an electronic device and a readable storage medium.

BACKGROUND OF THE DISCLOSURE

With popularization of smart phones and the mobile Internet, the Internet starts to run through people's basic necessities of life, and some new network terms continuously appear in the Internet, and have certain concealment. Since some sensitive words existing in the Internet are deliberately created by relevant persons to evade supervision, the sensitive words have higher concealment, resulting in technical problems of lower mining accuracy and mining efficiency when the sensitive words in the Internet are mined in a prior art.

SUMMARY OF THE DISCLOSURE

According to a first aspect of the present disclosure, there is provided a word mining method, including: acquiring search data; taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph; obtaining a label vector of each search sentence in the behavior graph according to a search sentence with a preset label in the behavior graph; determining a target search sentence in the behavior graph according to the label vector; and extracting a target word from the target search sentence, and taking the target word as a word mining result of the search data.

According to a second aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a word mining method, wherein the word mining method includes: acquiring search data; taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph; obtaining a label vector of each search sentence in the behavior graph according to a search sentence with a preset label in the behavior graph; determining a target search sentence in the behavior graph according to the label vector; and extracting a target word from the target search sentence, and take the target word as a word mining result of the search data.

According to a third aspect of the present disclosure, there is provided a non-transitory computer readable storage medium with computer instructions stored thereon, wherein the computer instructions are used for causing a word mining method, wherein the word mining method includes: acquiring search data; taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph; obtaining a label vector of each search sentence in the behavior graph according to a search sentence with a preset label in the behavior graph; determining a target search sentence in the behavior graph according to the label vector; and extracting a target word from the target search sentence, and taking the target word as a word mining result of the search data.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

Figure 1:
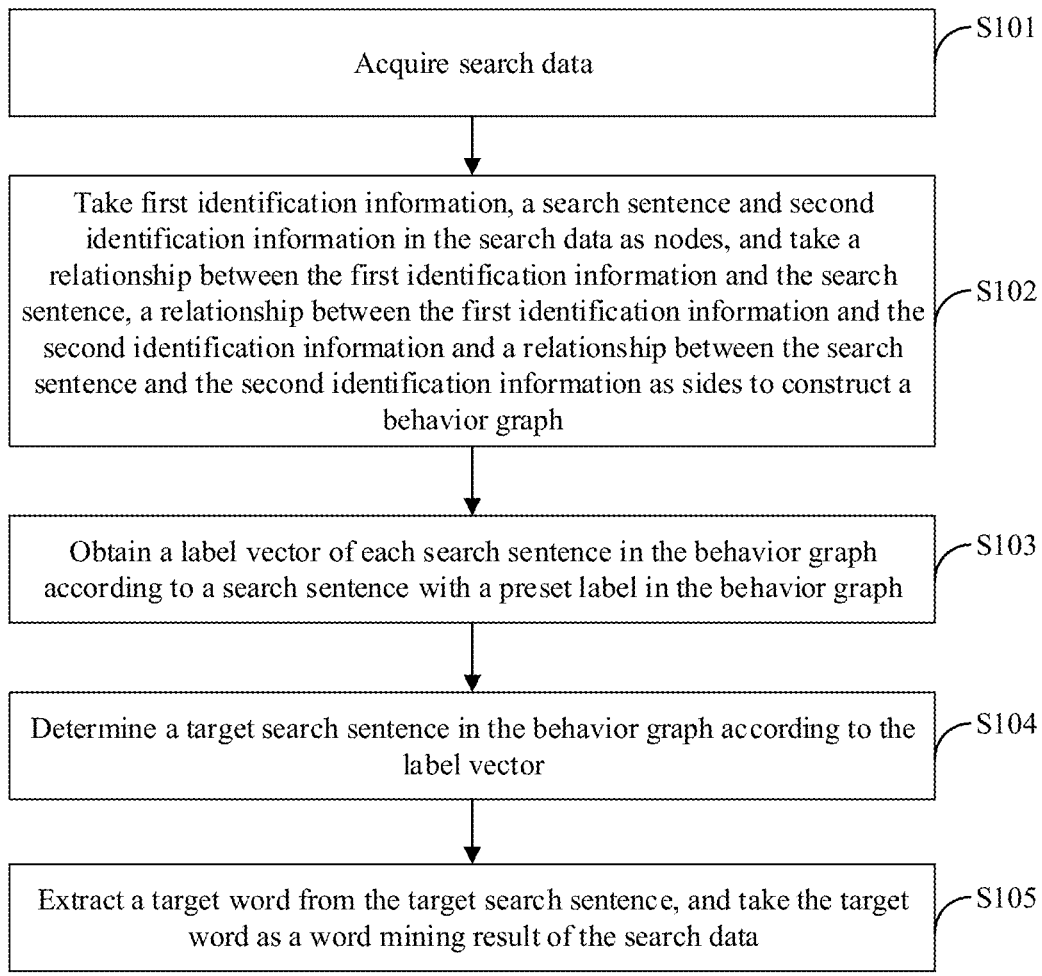
FIG. 1 is a schematic diagram according to a first embodiment of the present disclosure.

FIG. 1 is a schematic diagram according to a first embodiment of the present disclosure. As shown in FIG. 1, a word mining method according to the present embodiment may include the following steps:

S101: acquiring search data; S102: taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph;

S103: obtaining a label vector of each search sentence in the behavior graph according to a search sentence with a preset label in the behavior graph;

S104: determining a target search sentence in the behavior graph according to the label vector; and S105: extracting a target word from the target search sentence, and taking the target word as a word mining result of the search data.

In the word mining method according to the present embodiment, after the behavior graph is constructed according to the first identification information, the search sentence and the second identification information in the search data, the target search sentence in the behavior graph is determined according to the relationship between the first search sentence with the preset label in the behavior graph and each node in the behavior graph, and then, the target word extracted from the target search sentence is used as the word mining result of the search data; in the present embodiment, since the target word may be mined according to relevance between search behaviors in the search data, target word mining accuracy and efficiency are improved.

In the present embodiment, the search data acquired in S101 is behavior data generated when a search is performed at different input terminals; the search data may be acquired according to log data corresponding to different input terminals.

In the present embodiment, the search data acquired in S101 includes the first identification information, the search sentence, and the second identification information; the first identification information is identification information of an input terminal, such as input terminal ID, input terminal UID, or the like; the search sentence is query text input during the search at the input terminal; and the second identification information is session identification information, such as SessionID, generated by a server during the search at the input terminal, and the same session identification information corresponds to all search behaviors performed at the input terminal within a period of time.

In the present embodiment, the search data acquired in S101 may further include time information during the search at the input terminal, for example, a search time range of the second identification information, search time of the search sentence, or the like.

In the present embodiment, after the acquisition of the search data in S101, S102 is executed to construct the behavior graph according to the acquired search data.

In the present embodiment, the behavior graph constructed in S102 includes plural nodes and sides between the plural nodes; in the present embodiment, the first identification information, the search sentence and the second identification information in the search data are used as the nodes in the behavior graph, and the relationship between the first identification information and the search sentence, the relationship between the first identification information and the second identification information, and the relationship between the second identification information and the search sentence are used as the sides in the behavior graph.

Specifically, in the present embodiment, when S102 is executed to construct the behavior graph, the relationship between the first identification information and the search sentence is a search behavior relationship for indicating input terminals inputting different search sentences; the relationship between the first identification information and the second identification information is a search behavior relationship for indicating input terminals initiating different sessions; and the relationship between the second identification information and the search sentence is a search belonging relationship for indicating search sentences input at the input terminals in a same session.

For example, in the present embodiment, if the search data acquired in S101 includes input terminal 1, search sentence 1, search sentence 2, Session1 and Session2, and if the search sentence 1 is input into the Session1 and the search sentence 2 is input into the Session2 at the input terminal 1, a side between the input terminal 1 and the search sentence 1, a side between the input terminal 1 and the search sentence 2, a side between the input terminal 1 and the Session1, a side between the input terminal 1 and the Session2, a side between the Session1 and the search sentence 1, and a side between the Session2 and the search sentence 2 are established in the behavior graph constructed in S102.

In addition, in the present embodiment, during the execution of S102 of taking first identification information, a search sentence and second identification information as nodes, and taking a relationship between the first identification information and the search sentence, a relationship between the first identification information and the second identification information and a relationship between the search sentence and the second identification information as sides to construct a behavior graph, an optional implementation may include: acquiring a known target word; taking the known target word, the first identification information, the search sentence and the second identification information as the nodes; and taking the relationship between the first identification information and the search sentence, the relationship between the first identification information and the second identification information, the relationship between the search sentence and the second identification information and a relationship between the search sentence and the known target word as sides to construct the behavior graph; in the behavior graph constructed in the present embodiment, the relationship between the search sentence and the known target word is a search sensitivity-related relationship for indicating whether the search sentence input at the input terminal is related to sensitive content.

In the present embodiment, the known target word is a known sensitive word. That is, in the present embodiment, during the construction of the behavior graph, the known target word and the relationship between the search sentence and the known target word are also added, thereby improving integrity of the behavior graph, and further improving accuracy when the preset label of the search sentence in the behavior graph is annotated.

In the present embodiment, during the execution of S102 of taking a relationship between the search sentence and the known target word as a side, the search sentence may be matched with the known target word, the known target word included in the search sentence is determined according to a matching result, and then, the side between the search sentence and the known target word included in the search sentence is established in the behavior graph.

For example, in the present embodiment, if the known target words acquired in S102 are target word 1 and target word 2, and if the search sentence 1 includes the target word 2 and the search sentence 2 includes the target word 1, a side between the search sentence 1 and the target word 2 and a side between the search sentence 2 and the target word 1 are established in the behavior graph constructed in S102 in the present embodiment.

In the present embodiment, after the execution of S102 of constructing a behavior graph, S103 of obtaining a label vector of each search sentence in the behavior graph according to a search sentence with a preset label in the behavior graph is executed; the preset label in the present embodiment is a sensitive label, and the label vector in the present embodiment is used for indicating probability information that the search sentence belongs to different preset labels.

In the present embodiment, during the execution of S103, the search sentence with the preset label in the behavior graph is the first search sentence, the first search sentence includes the known target word, and the preset label of the first search sentence is a label corresponding to the included known target word.

In the present embodiment, if the behavior graph constructed in S102 includes the known target word and the relationship between the search sentence and the known target word, during the execution of S103 in the present embodiment, the search sentence having a connection relationship with the known target word may be directly used as the first search sentence, and the preset label of the first search sentence is obtained according to the connected known target word.

In the present embodiment, if the behavior graph constructed in S102 does not include the known target word and the relationship between the search sentence and the known target word, during the execution of S103 in the present embodiment, a specific sentence selected from the behavior graph may be used as the first search sentence, and the preset label of the first search sentence is annotated.

Specifically, in the present embodiment, during the execution of S103 of obtaining a label vector of each search sentence in the behavior graph according to a search sentence with a preset label in the behavior graph, an optional implementation may include: determining adjacent search sentences of each search sentence according to preset relationships between the nodes in the behavior graph, the adjacent search sentences including the first search sentence; and obtaining the label vector of each search sentence according to the preset labels of the determined adjacent search sentences.

That is, in the present embodiment, S103 is executed to obtain the label vector of each search sentence in the behavior graph; that is, according to the relationship between the nodes in the behavior graph, the preset label of the search sentence with the preset label is transferred to a search sentence without the preset label.

In the present embodiment, during the execution of S103 of determining adjacent search sentences of each search sentence according to preset relationships between the nodes in the behavior graph, an optional implementation may include: for each search sentence in the behavior graph, taking the search sentence having same first identification information and/or same second identification information as a current search sentence as the adjacent search sentence of the current search sentence.

In the present embodiment, the first identification information used in S103 may be preset first identification information, for example, identification information corresponding to a specified input terminal; the second identification information used in S103 may be preset second identification information, for example, session identification information including the search sentence with the preset label.

That is, in the present embodiment, based on assumptions that "if a user inputs a search sentence including a target word for search, other search sentences input by the user may include the target word" and "if the user inputs a search sentence including a target word for search in one session, other search sentences input by the user in this session may include the target word", the adjacent search sentences of each search sentence in the behavior graph may be accurately determined, thereby improving accuracy of the obtained probability information.

In the present embodiment, during the execution of S103 of obtaining the label vector of each search sentence according to the preset labels of the determined adjacent search sentences, an optional implementation may include: for each search sentence, according to a number of the adjacent search sentences and occurrence numbers of different preset labels, obtaining the probability information of each search sentence belonging to different preset labels as the label vector of each search sentence; calculating a loss value according to a label vector and an annotation result of a verification sample in the search sentence, the verification sample in the present embodiment being preset, for example, a certain number of search sentences being selected in the behavior graph as the verification samples and being annotated, and similarity between the label vector and the annotation result being calculated as the loss value in the present embodiment; and under a condition that the calculated loss value is determined not to meet a preset condition, taking the preset label corresponding to the maximum probability value in the label vector of each search sentence as the preset label of each search sentence, and then proceeding to the step of according to a number of the adjacent search sentences and occurrence numbers of different preset labels, obtaining the probability information of each search sentence belonging to different preset labels as the label vector of each search sentence until the calculated loss value meets the preset condition.

That is, in the present embodiment, the label vector of each search sentence in the behavior graph is obtained by means of continuous iteration in conjunction with the preset verification sample, such that accuracy of the obtained label vector may be improved, thus correspondingly improving accuracy of the extracted target word.

For example, if the preset labels in the present embodiment include label 1, label 2 and label 3, the verification sample is the search sentence 1 in the behavior graph, and the preset label of the search sentence 1 is label 2, the annotation result of the search sentence 1 is (0, 1, 0), and if the obtained label vector of the search sentence 1 is (0.1, 0.7, 0.2), the similarity between (0, 1, 0) and (0.1, 0.7, 0.2), such as cosine similarity, is calculated as the loss value.

In the present embodiment, S103 of determining whether the calculated loss value meets the preset condition may include: determining whether the calculated loss value is greater than a preset loss threshold, or whether a number of times the calculated loss value is greater than the preset loss threshold exceeds a preset number of times.

In the present embodiment, after the execution of S103 of obtaining a label vector of each search sentence in the behavior graph, S104 of determining a target search sentence in the behavior graph according to the obtained label vector is executed.

In the present embodiment, during the execution of S104 of determining a target search sentence in the behavior graph according to the obtained label vector, an optional implementation may include: for each search sentence, taking the preset label corresponding to the maximum probability value in the label vector of the current search sentence as an annotation label of the current search sentence; acquiring a label threshold of the annotation label; and under a condition that the maximum probability value is determined to be greater than the acquired label threshold, taking the current search sentence as the target search sentence.

That is, in the present embodiment, by setting the label threshold of the annotation label, a problem that a search sentence without the target word is taken as the target search sentence may be solved as much as possible, thereby more accurately determining the target search sentence in the behavior graph.

In the present embodiment, during the execution of S104 of determining a target search sentence in the behavior graph according to the obtained label vector, a search sentence corresponding to a label vector having probability values which are not all zero may also be directly used as the target search sentence.

In addition, in the present embodiment, after S104 is executed to determine the target search sentence in the behavior graph, the method may further include: filtering out a known search sentence in the determined target search sentences.

In the present embodiment, after S104 is executed to determine the target search sentence, S105 of extracting a target word from the determined target search sentence and taking the extracted target word as a word mining result of the search data is executed, and the target word extracted from the target search sentence in S105 is a sensitive word.

Specifically, in the present embodiment, during the execution of S105 of extracting a target word from the determined target search sentence, an optional implementation may include: inputting the target search sentence into a target word prediction model obtained by a pre-training operation; and extracting the target word in the target search sentence according to an output result of the target word prediction model.

In addition, in the present embodiment, during the execution of S105 of extracting a target word from the target search sentence, the target word may also be extracted according to the target search sentence and the annotation label of the target search sentence; for example, the target search sentence and the annotation label of the target search sentence are input into the target word prediction model together, so as to improve the accuracy of the extracted target word.

In the present embodiment, after the execution of S105 of extracting a target word from the target search sentence, the extracted target word may be used as the word mining result of the search data.

In the present embodiment, whether the target word appears in text may be accurately judged using the word mining result obtained in S105, or the word mining result may be used as the known target word to continuously extract target words in other search data.

In the method according to the present embodiment, after the behavior graph is constructed according to the first identification information, the search sentence and the second identification information in the search data, the target search sentence in the behavior graph is determined according to the relationship between the first search sentence with the preset label in the behavior graph and each node in the behavior graph, and then, the target word extracted from the target search sentence is used as the word mining result of the search data; in the present embodiment, since the target word may be mined according to the relevance between the search behaviors in the search data, the target word mining accuracy and efficiency are improved.

Figure 2:
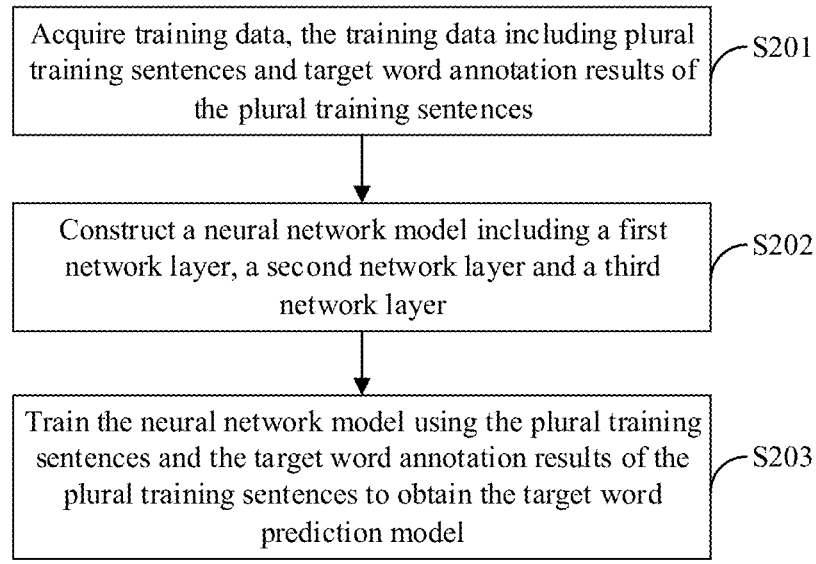
FIG. 2 is a schematic diagram according to a second embodiment of the present disclosure.

FIG. 2 is a schematic diagram according to a second embodiment of the present disclosure. As shown in FIG. 2, in the present embodiment, a target word prediction model is obtained by a pre-training operation as follows:

S201: acquiring training data, the training data including plural training sentences and target word annotation results of the plural training sentences;

S202: constructing a neural network model including a first network layer, a second network layer and a third network layer; and S203: training the neural network model using the plural training sentences and the target word annotation results of the plural training sentences to obtain the target word prediction model.

In the present embodiment, in the training data obtained in S201, the target word annotation result of the training sentence is obtained using a BIO annotation method, and in the target word annotation result, label B indicates the start of the target word, label I indicates content of the target word, and label O indicates the exterior of the target word.

In the present embodiment, in the neural network model constructed in S202, the first network layer is configured to output semantic information of each semantic unit (such as a character or a word) in the input sentence, and the first network layer may be a pre-trained model, such as ERNIE; the second network layer is configured to output prediction labels of the semantic units in the input sentence according to an output result of the first network layer, and the second network layer may be a long short-term memory (LSTM) network, such as a bidirectional long short-term memory network; and the third network layer is configured to output an optimal label sequence of the input sentence according to an output result of the second network layer, and the third network layer may be a conditional random field (CRF) model.

In the present embodiment, during the execution of S203 of training the neural network model using the plural training sentences and the target word annotation results of the plural training sentences to obtain the target word prediction model, an optional implementation may include: inputting the plural training sentences into the neural network model to obtain a target word prediction result output by the neural network model for each training sentence; and adjusting parameters of the neural network model according to a loss function value calculated based on the target word prediction result and the target word annotation result of the training sentence until the neural network model converges, so as to obtain the target word prediction model.

By the target word prediction model obtained by the training operation in the present embodiment, the target word in the target search sentence may be more accurately extracted.

Figure 3:
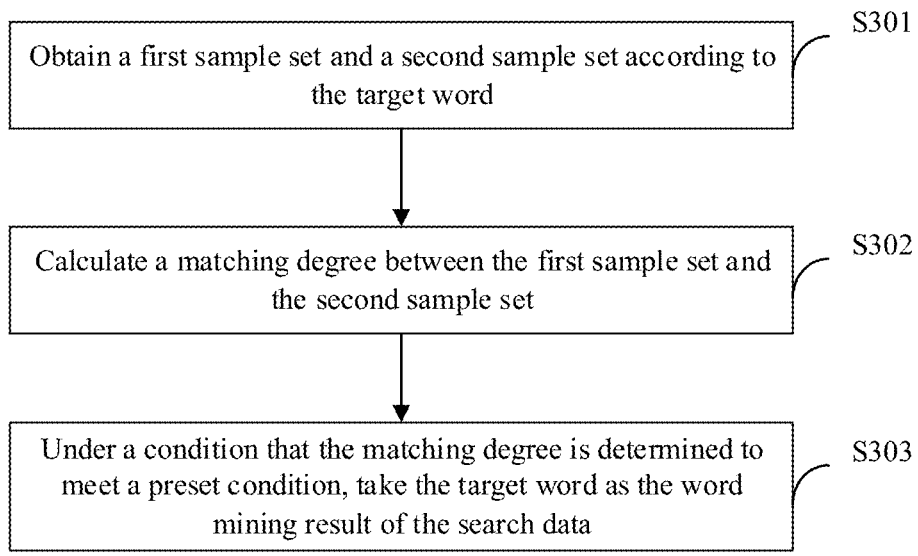
FIG. 3 is a schematic diagram according to a third embodiment of the present disclosure.

FIG. 3 is a schematic diagram according to a third embodiment of the present disclosure. As shown in FIG. 3, in the present embodiment, after the execution of S105 of extracting a target word from the target search sentence, the method further includes the following steps:

S301: obtaining a first sample set and a second sample set according to the target word;

S302: calculating a matching degree between the first sample set and the second sample set; and S303: under a condition that the matching degree is determined to meet a preset condition, taking the target word as the word mining result of the search data.

That is, in the present embodiment, according to the matching degree between the first sample set and the second sample set constructed by the target word, the target word extracted from the target search sentence is verified, thus ensuring that the extracted target word has high quality, and improving the word mining accuracy.

In the present embodiment, during the execution of S301 of obtaining a first sample set and a second sample set according to the target word, an optional implementation may include: replacing the target word in the known search sentence with the extracted target word, and obtaining the first sample set according to replacement text; and using the extracted target word for a search to obtain the second sample set according to the text including the target word in a search result.

In addition, in the present embodiment, during the execution of S301 of obtaining a first sample set and a second sample set according to the target word, an optional implementation may include: using the extracted target word for the search according to a preset time interval; and under a condition that a quantity of the text including the target word in the search result exceeds a preset recall threshold, obtaining the first sample set and the second sample set according to the target word.

In the present embodiment, during the execution of S302 of calculating a matching degree between the first sample set and the second sample set, a quantity of same text or text with similarity exceeding a preset similarity threshold in the two sample sets may be used as the matching degree between the first sample set and the second sample set; a division result between the quantity of the same text or the text with the similarity exceeding the preset similarity threshold in the two sample sets and a quantity of all text in the second sample set may be used as the matching degree between the first sample set and the second sample set.

Figure 4:
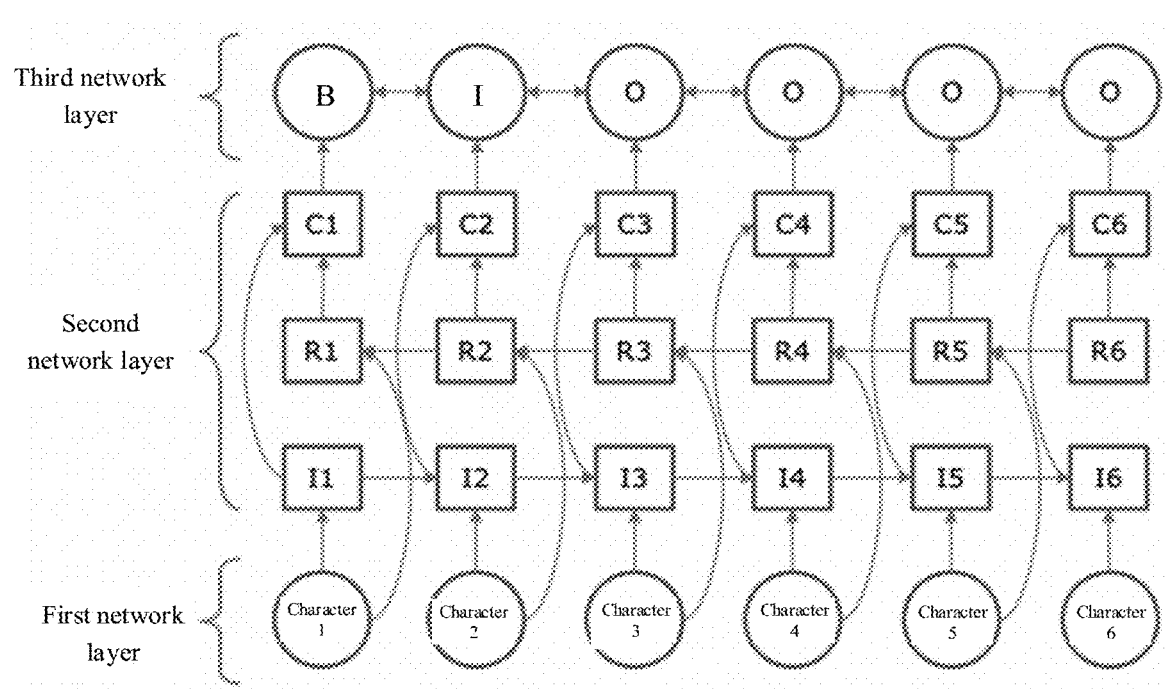
FIG. 4 is a schematic diagram according to a fourth embodiment of the present disclosure.

FIG. 4 is a schematic diagram according to a fourth embodiment of the present disclosure. FIG. 4 shows a flow chart of extracting the target word in the target search sentence using the target word prediction model obtained by the pre-training operation in the present embodiment; the target search sentence includes character 1, character 2, character 3, character 4, character 5 and character 6; the target search sentence is input into the target word prediction model, and processed by the first network layer, the second network layer and the third network layer, so as to output a corresponding label sequence "BIOOOO"; and according to the label sequence, the characters corresponding to the label B and the label I in the target search sentence are extracted to be used as the target word; that is, the character 1 and the character 2 are extracted to obtain the target word.

Figure 5:
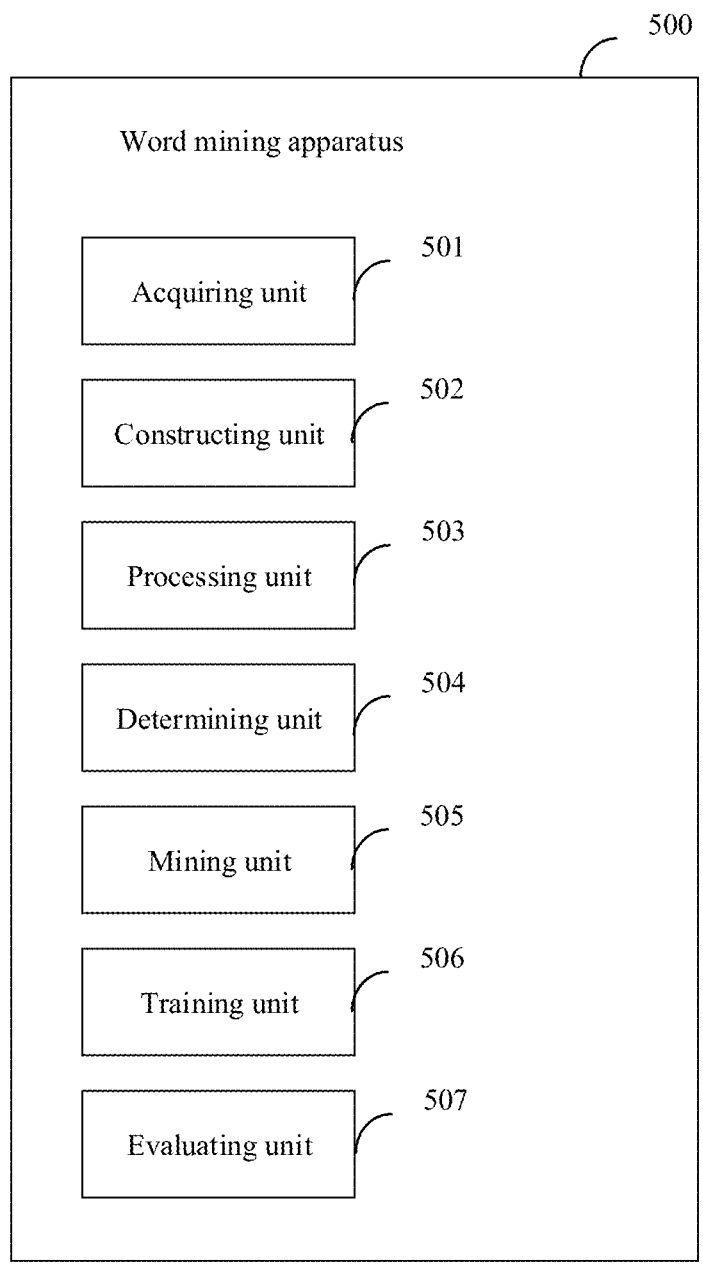
FIG. 5 is a schematic diagram according to a fifth embodiment of the present disclosure.

FIG. 5 is a schematic diagram according to a fifth embodiment of the present disclosure. As shown in FIG. 5, a word mining apparatus 500 according to the present embodiment includes:

an acquiring unit 501 configured to acquire search data;

a constructing unit 502 configured to take first identification information, a search sentence and second identification information in the search data as nodes, and take a relationship between the first identification information and the search sentence, a relationship between the first identification information and the second identification information and a relationship between the search sentence and the second identification information as sides to construct a behavior graph;

a processing unit 503 configured to obtain a label vector of each search sentence in the behavior graph according to a search sentence with a preset label in the behavior graph;

a determining unit 504 configured to determine a target search sentence in the behavior graph according to the label vector; and a mining unit 505 configured to extract a target word from the target search sentence, and take the target word as a word mining result of the search data.

The search data acquired by the acquiring unit 501 is behavior data generated when a search is performed at different input terminals; the acquiring unit 501 may acquire the search data according to log data corresponding to different input terminals.

The search data acquired by the acquiring unit 501 includes the first identification information, the search sentence, and the second identification information; the first identification information is identification information of an input terminal; the search sentence is query text input during the search at the input terminal; and the second identification information is session identification information generated by a server during the search at the input terminal.

The search data acquired by the acquiring unit 501 may further include time information during the search at the input terminal, for example, a search time range of the second identification information, search time of the search sentence, or the like.

In the present embodiment, after the acquisition of the search data by the acquiring unit 501, the behavior graph is constructed by the constructing unit 502 according to the acquired search data.

The behavior graph constructed by the constructing unit 502 includes plural nodes and sides between the plural nodes; the constructing unit 502 takes the first identification information, the search sentence and the second identification information in the search data as the nodes in the behavior graph, and takes the relationship between the first identification information and the search sentence, the relationship between the first identification information and the second identification information, and the relationship between the second identification information and the search sentence as the sides in the behavior graph.

Specifically, when the constructing unit 502 constructs the behavior graph, the relationship between the first identification information and the search sentence is a search behavior relationship for indicating input terminals inputting different search sentences; the relationship between the first identification information and the second identification information is a search behavior relationship for indicating input terminals initiating different sessions; and the relationship between the second identification information and the search sentence is a search belonging relationship for indicating search sentences input at the input terminals in a same session.

In addition, when taking the first identification information, the search sentence and the second identification information as the nodes, and taking the relationship between the first identification information and the search sentence, the relationship between the first identification information and the second identification information and the relationship between the search sentence and the second identification information as the sides to construct the behavior graph, an optional implementation, the constructing unit 502 may: acquire a known target word; take the known target word, the first identification information, the search sentence and the second identification information as the nodes; and take the relationship between the first identification information and the search sentence, the relationship between the first identification information and the second identification information, the relationship between the search sentence and the second identification information and a relationship between the search sentence and the known target word as sides to construct the behavior graph.

That is, during the construction of the behavior graph, the constructing unit 502 may also add the known target word and the relationship between the search sentence and the known target word, thereby improving integrity of the behavior graph, and further improving accuracy when the preset label of the search sentence in the behavior graph is annotated.

When the constructing unit 502 takes the relationship between the search sentence and the known target word as the side, the search sentence may be matched with the known target word, the known target word included in the search sentence is determined according to a matching result, and then, the side between the search sentence and the known target word included in the search sentence is established in the behavior graph.

In the present embodiment, after the constructing unit 502 constructs the behavior graph, the processing unit 503 obtains the label vector of each search sentence in the behavior graph according to a search sentence with a preset label in the behavior graph; the label vector obtained by the processing unit 503 is used for indicating probability information that the search sentence belongs to different preset labels.

The search sentence with the preset label in the behavior graph is a first search sentence; if the behavior graph constructed by the constructing unit 502 includes the known target word and the relationship between the search sentence and the known target word, the processing unit 503 may directly take the search sentence having a connection relationship with the known target word as the first search sentence, and obtains the preset label of the first search sentence according to the connected known target word.

If the behavior graph constructed by the constructing unit 502 does not include the known target word and the relationship between the search sentence and the known target word, the processing unit 503 may take a specific sentence selected from the behavior graph as the first search sentence, and annotate the preset label of the first search sentence.

When obtaining the label vector of each search sentence in the behavior graph according to the search sentence with the preset label in the behavior graph, as an optional implementation, the processing unit 503 may: determine adjacent search sentences of each search sentence according to preset relationships between the nodes in the behavior graph; and obtain the label vector of each search sentence according to target labels of the determined adjacent search sentences.

That is, the processing unit 503 obtains the label vector of each search sentence in the behavior graph; that is, according to the relationship between the nodes in the behavior graph, the preset label of the search sentence with the preset label is transferred to a search sentence without the preset label.

When determining the adjacent search sentences of each search sentence according to the preset relationships between the nodes in the behavior graph, as an optional implementation, the processing unit 503 may: for each search sentence in the behavior graph, take the search sentence having same first identification information and/or same second identification information as a current search sentence as the adjacent search sentence of the current search sentence.

The first identification information used by the processing unit 503 may be preset first identification information, for example, input-terminal identification information corresponding to a specified input terminal; the second identification information used by the processing unit 503 may be preset second identification information, for example, session identification information including the search sentence with the preset label.

When obtaining the label vector of each search sentence according to the preset labels of the determined adjacent search sentences, as an optional implementation, the processing unit 503 may: for each search sentence, according to a number of the adjacent search sentences and occurrence numbers of different preset labels, obtain the probability information of each search sentence belonging to different preset labels as the label vector of each search sentence; calculate a loss value according to a label vector and an annotation result of a verification sample in the search sentence; and under a condition that the calculated loss value is determined not to meet a preset condition, take the preset label corresponding to the maximum probability value in the label vector of each search sentence as the preset label of each search sentence, and then proceed to the step of according to a number of the adjacent search sentences and occurrence numbers of different preset labels, obtaining the probability information of each search sentence belonging to different preset labels as the label vector of each search sentence until the calculated loss value meets the preset condition.

That is, the processing unit 503 obtains the label vector of each search sentence in the behavior graph by means of continuous iteration in conjunction with the preset verification sample, such that accuracy of the obtained label vector may be improved, thus correspondingly improving accuracy of the extracted target word.

When determining whether the calculated loss value meets the preset condition, the processing unit 503 may: determine whether the calculated loss value is greater than a preset loss threshold, or whether a number of times the calculated loss value is greater than the preset loss threshold exceeds a preset number of times.

In the present embodiment, after the processing unit 503 obtains the label vector of each search sentence in the behavior graph, the determining unit 504 determines the target search sentence in the behavior graph according to the obtained label vector.

When determining the target search sentence in the behavior graph according to the obtained label vector, as an optional implementation, the determining unit 504 may: for each search sentence, take the preset label corresponding to the maximum probability value in the label vector of the current search sentence as an annotation label of the current search sentence; acquire a label threshold of the annotation label; and under a condition that the maximum probability value is determined to be greater than the acquired label threshold, take the current search sentence as the target search sentence.

That is, by setting the label threshold of the annotation label, the determining unit 504 may solve a problem that a search sentence without the target word is taken as the target search sentence as much as possible, thereby more accurately determining the target search sentence in the behavior graph.

When determining the target search sentence in the behavior graph according to the obtained label vector, the determining unit 504 may also directly take a search sentence corresponding to a label vector having probability values which are not all zero as the target search sentence.

In addition, after determining the target search sentence in the behavior graph, the determining unit 504 may further: filter out a known search sentence in the determined target search sentences.

In the present embodiment, after the determining unit 504 determines the target search sentence, the mining unit 505 extracts the target word from the determined target search sentence and takes the extracted target word as the word mining result of the search data.

When extracting the target word from the determined target search sentence, as an optional implementation, the mining unit 505 may: input the target search sentence into a target word prediction model obtained by a pre-training operation; and extract the target word in the target search sentence according to an output result of the target word prediction model.

In addition, when extracting the target word from the target search sentence, the mining unit 505 may also extract the target word according to the target search sentence and the annotation label of the target search sentence, for example, input the target search sentence and the annotation label of the target search sentence into the target word prediction model together, so as to improve the accuracy of the extracted target word.

The word mining apparatus 500 according to the present embodiment may further include: a training unit 506 configured to obtain the target word prediction model by a pre-training operation as follows: acquiring training data, the acquired training data including plural training sentences and target word annotation results of the plural training sentences; constructing a neural network model including a first network layer, a second network layer and a third network layer; and training the neural network model using the plural training sentences and the target word annotation results of the plural training sentences to obtain the target word prediction model.

In the training data obtained by the training unit 506, the target word annotation result of the training sentence is obtained using a BIO annotation method, and in the target word annotation result, label B indicates the start of the target word, label I indicates content of the target word, and label O indicates the exterior of the target word.

In the neural network model constructed by the training unit 506, the first network layer is configured to output semantic information of each semantic unit (such as a character or a word) in the input sentence; the second network layer is configured to output prediction labels of the semantic units in the input sentence according to an output result of the first network layer; and the third network layer is configured to output an optimal label sequence of the input sentence according to an output result of the second network layer.

When training the neural network model using the plural training sentences and the target word annotation results of the plural training sentences to obtain the target word prediction model, as an optional implementation, the training unit 506 may: input the plural training sentences into the neural network model to obtain a target word prediction result output by the neural network model for each training sentence; and adjust parameters of the neural network model according to a loss function value calculated based on the target word prediction result and the target word annotation result of the training sentence until the neural network model converges, so as to obtain the target word prediction model.

The word mining apparatus 500 according to the present embodiment may further include: an evaluating unit 507 configured to perform the following operations after the mining unit 505 extracts the target word from the target search sentence: obtaining a first sample set and a second sample set according to the target word; calculating a matching degree between the first sample set and the second sample set; and under a condition that the matching degree is determined to meet a preset condition, taking the target word as the word mining result of the search data.

When obtaining the first sample set and the second sample set according to the target word, as an optional implementation, the evaluating unit 507 may: replace the target word in the known search sentence with the extracted target word, and obtain the first sample set according to replacement text; and use the extracted target word for a search to obtain the second sample set according to the text including the target word in a search result.

In addition, when obtaining the first sample set and the second sample set according to the target word, as an optional implementation, the evaluating unit 507 may: use the extracted target word for the search according to a preset time interval; and under a condition that a quantity of the text including the target word in the search result exceeds a preset recall threshold, obtain the first sample set and the second sample set according to the target word.

When calculating the matching degree between the first sample set and the second sample set, the evaluating unit 507 may take a quantity of same text or text with similarity exceeding a preset similarity threshold in the two sample sets as the matching degree between the first sample set and the second sample set; or take a division result between the quantity of the same text or the text with the similarity exceeding the preset similarity threshold in the two sample sets and a quantity of all text in the second sample set as the matching degree between the first sample set and the second sample set.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 6:
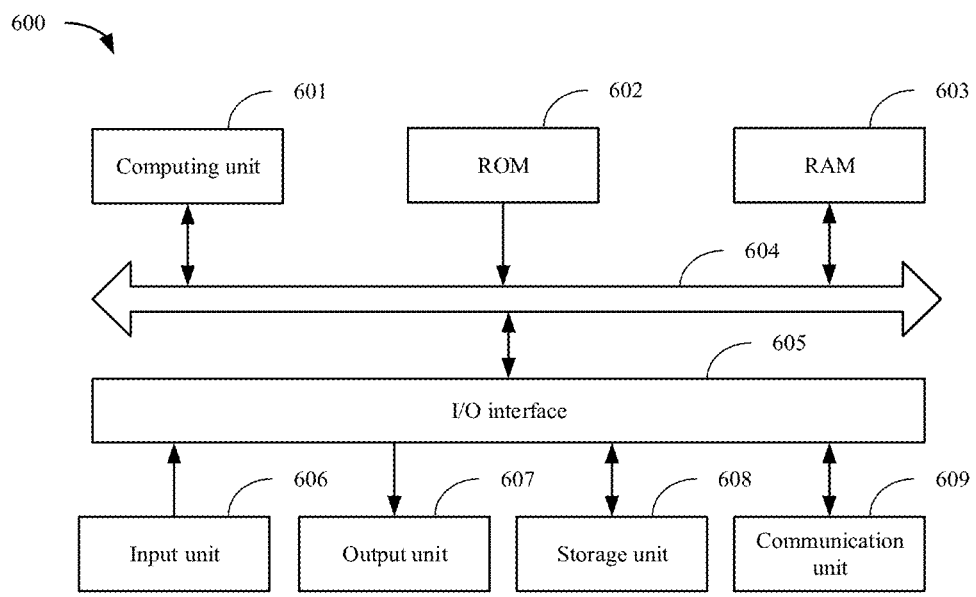
FIG. 6 is a block diagram of an electronic device configured to implement a word mining method according to the embodiment of the present disclosure.

FIG. 6 is a block diagram of an electronic device configured to implement the word mining method according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the word mining method. For example, in some embodiments, the word mining method may be implemented as a computer software program tangibly contained in a machine readable medium, such as the storage unit 608.

In some embodiments, part or all of the computer program may be loaded and/or installed into the device 600 via the ROM 602 and/or the communication unit 609. When the computer program is loaded into the RAM 603 and executed by the computing unit 601, one or more steps of the word mining method described above may be performed. Alternatively, in other embodiments, the computing unit 601 may be configured to perform the word mining method by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable word mining apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A word mining method, comprising:
    acquiring search data;
    taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph;
    obtaining a label vector of each search sentence in the behavior graph according to a search sentence with a preset label in the behavior graph;
    determining a target search sentence in the behavior graph according to the label vector; and
    extracting a target word from the target search sentence, and taking the target word as a word mining result of the search data,
    wherein the taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph comprises:
    acquiring a known target word;
    taking the known target word, the first identification information, the search sentence and the second identification information as the nodes; and
    taking the relationship between the first identification information and the search sentence, the relationship between the first identification information and the second identification information, the relationship between the search sentence and the second identification information and a relationship between the search sentence and the known target word as sides to construct the behavior graph.

2. The method according to claim 1, wherein the obtaining a label vector of each search sentence in the behavior graph according to a search sentence with a preset label in the behavior graph comprises:
    determining adjacent search sentences of each search sentence according to preset relationships between the nodes in the behavior graph; and
    obtaining the label vector of each search sentence according to the preset labels of the adjacent search sentences.

3. The method according to claim 2, wherein the determining adjacent search sentences of each search sentence according to preset relationships between the nodes in the behavior graph comprises:
    for each search sentence, taking the search sentence having same first identification information and/or same second identification information as a current search sentence as the adjacent search sentence of the current search sentence.

4. The method according to claim 2, wherein the obtaining the label vector of each search sentence according to sensitive labels of the adjacent search sentences comprises:
    for each search sentence, according to a number of the adjacent search sentences and occurrence numbers of different preset labels, obtaining probability information of each search sentence belonging to different preset labels as the label vector of each search sentence;
    calculating a loss value according to a label vector and an annotation result of a verification sample in the search sentence; and
    under a condition that the calculated loss value is determined not to meet a preset condition, taking the preset label corresponding to the maximum probability value in the label vector of each search sentence as the preset label of each search sentence, and then proceeding to the step of according to a number of the adjacent search sentences and occurrence numbers of different preset labels, obtaining the probability information of each search sentence belonging to different preset labels as the label vector of each search sentence until the calculated loss value meets the preset condition.

5. The method according to claim 1, wherein the determining a target search sentence in the behavior graph according to the label vector comprises:
    for each search sentence, taking the preset label corresponding to a maximum probability value in the label vector of the current search sentence as an annotation label of the current search sentence;
    acquiring a label threshold of the annotation label; and
    under a condition that the maximum probability value is determined to be greater than the label threshold, taking the current search sentence as the target search sentence.

6. The method according to claim 1, further comprising:
    after the target word is extracted from the target search sentence, obtaining a first sample set and a second sample set according to the target word;
    calculating a matching degree between the first sample set and the second sample set; and
    under a condition that the matching degree is determined to meet a preset condition, taking the target word as the word mining result of the search data.

7. An electronic device, comprising:
    at least one processor; and
    a memory communicatively connected with the at least one processor;
    wherein the memory stores instructions executable by the at least one processor, and the instructions are executed by the at least one processor to enable the at least one processor to perform a word mining method, wherein the word mining method comprises:
    acquiring search data;
    taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph;

obtaining a label vector of each search sentence in the behavior graph according to a search sentence with a preset label in the behavior graph;

determining a target search sentence in the behavior graph according to the label vector; and extracting a target word from the target search sentence, and taking the target word as a word mining result of the search data, wherein the taking the first identification information, the search sentence and the second identification information in the search data as the nodes, and taking the relationship between the first identification information and the search sentence, the relationship between the first identification information and the second identification information and the relationship between the search sentence and the second identification information as the sides to construct the behavior graph comprises:

acquiring a known target word;

taking the known target word, the first identification information, the search sentence and the second identification information as the nodes; and taking the relationship between the first identification information and the search sentence, the relationship between the first identification information and the second identification information, the relationship between the search sentence and the second identification information and a relationship between the search sentence and the known target word as sides to construct the behavior graph.

8. The electronic device according to claim 7, wherein the obtaining the label vector of each search sentence in the behavior graph according to the search sentence with the preset label in the behavior graph comprises:

determining adjacent search sentences of each search sentence according to preset relationships between the nodes in the behavior graph; and obtaining the label vector of each search sentence according to the preset labels of the adjacent search sentences.

9. The electronic device according to claim 8, wherein the determining the adjacent search sentences of each search sentence according to the preset relationships between the nodes in the behavior graph comprises:

for each search sentence, taking the search sentence having same first identification information and/or same second identification information as a current search sentence as the adjacent search sentence of the current search sentence.

10. The electronic device according to claim 8, wherein the obtaining the label vector of each search sentence according to the preset labels of the adjacent search sentences comprises:

for each search sentence, according to a number of the adjacent search sentences and occurrence numbers of different preset labels, obtaining probability information of each search sentence belonging to different preset labels as the label vector of each search sentence;

calculating a loss value according to a label vector and an annotation result of a verification sample in the search sentence; and under a condition that the calculated loss value is determined not to meet a preset condition, taking the preset label corresponding to the maximum probability value in the label vector of each search sentence as the preset label of each search sentence, and then proceeding to the step of according to a number of the adjacent search sentences and occurrence numbers of different preset labels, obtaining the probability information of each search sentence belonging to different preset labels as the label vector of each search sentence until the calculated loss value meets the preset condition.

11. The electronic device according to claim 7, wherein the determining the target search sentence in the behavior graph according to the label vector comprises:

for each search sentence, taking the preset label corresponding to a maximum probability value in the label vector of the current search sentence as an annotation label of the current search sentence;

acquiring a label threshold of the annotation label; and under a condition that the maximum probability value is determined to be greater than the label threshold, taking the current search sentence as the target search sentence.

12. The electronic device according to claim 7, further comprising:

after the mining method extracts the target word from the target search sentence, obtaining a first sample set and a second sample set according to the target word;

calculating a matching degree between the first sample set and the second sample set; and under a condition that the matching degree is determined to meet a preset condition, taking the target word as the word mining result of the search data.

13. A non-transitory computer readable storage medium with computer instructions stored thereon, wherein the computer instructions are used for causing a word mining method, wherein the word mining method comprises:

acquiring search data;

taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph;

obtaining a label vector of each search sentence in the behavior graph according to a search sentence with a preset label in the behavior graph;

determining a target search sentence in the behavior graph according to the label vector; and extracting a target word from the target search sentence, and taking the target word as a word mining result of the search data, wherein the taking first identification information, a search sentence and second identification information in the search data as nodes, and taking a relationship between the first identification information and the search sentence, a relationship between the first identification information and the second identification information and a relationship between the search sentence and the second identification information as sides to construct a behavior graph comprises:

acquiring a known target word;

taking the known target word, the first identification information, the search sentence and the second identification information as the nodes; and taking the relationship between the first identification information and the search sentence, the relationship between the first identification information and the second identification information, the relationship between the search sentence and the second identification information and a relationship between the search sentence and the known target word as sides to construct the behavior graph.

14. The non-transitory computer readable storage medium according to claim 13, wherein the obtaining a label vector of each search sentence in the behavior graph according to a search sentence with a preset label in the behavior graph comprises:
   determining adjacent search sentences of each search sentence according to preset relationships between the nodes in the behavior graph; and
   obtaining the label vector of each search sentence according to the preset labels of the adjacent search sentences.

15. The non-transitory computer readable storage medium according to claim 14, wherein the determining adjacent search sentences of each search sentence according to preset relationships between the nodes in the behavior graph comprises:
   for each search sentence, taking the search sentence having same first identification information and/or same second identification information as a current search sentence as the adjacent search sentence of the current search sentence.

16. The non-transitory computer readable storage medium according to claim 14, wherein the obtaining the label vector of each search sentence according to sensitive labels of the adjacent search sentences comprises:
   for each search sentence, according to a number of the adjacent search sentences and occurrence numbers of different preset labels, obtaining probability information of each search sentence belonging to different preset labels as the label vector of each search sentence;
   calculating a loss value according to a label vector and an annotation result of a verification sample in the search sentence; and
   under a condition that the calculated loss value is determined not to meet a preset condition, taking the preset label corresponding to the maximum probability value in the label vector of each search sentence as the preset label of each search sentence, and then proceeding to the step of according to a number of the adjacent search sentences and occurrence numbers of different preset labels, obtaining the probability information of each search sentence belonging to different preset labels as the label vector of each search sentence until the calculated loss value meets the preset condition.

17. The non-transitory computer readable storage medium according to claim 13, wherein the determining a target search sentence in the behavior graph according to the label vector comprises:
   for each search sentence, taking the preset label corresponding to a maximum probability value in the label vector of the current search sentence as an annotation label of the current search sentence;
   acquiring a label threshold of the annotation label; and
      under a condition that the maximum probability value is determined to be greater than the label threshold, taking the current search sentence as the target search sentence.

* * * * *